(12) United States Patent
Melkild

(10) Patent No.: US 10,972,409 B1
(45) Date of Patent: *Apr. 6, 2021

(54) VNFM ASSISTED FAULT HANDLING IN VIRTUAL NETWORK FUNCTION COMPONENTS

(71) Applicant: OPEN INVENTION NETWORK LLC, Durham, NC (US)

(72) Inventor: Keith William Melkild, Allen, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/917,748

(22) Filed: Jun. 30, 2020

Related U.S. Application Data

(63) Continuation of application No. 16/198,711, filed on Nov. 21, 2018, now Pat. No. 10,701,000.

(60) Provisional application No. 62/592,831, filed on Nov. 30, 2017.

(51) Int. Cl.
*H04L 12/26* (2006.01)
*H04L 12/939* (2013.01)
*H04L 12/24* (2006.01)

(52) U.S. Cl.
CPC ........ *H04L 49/557* (2013.01); *H04L 41/0668* (2013.01); *H04L 41/0672* (2013.01); *H04L 43/0811* (2013.01); *H04L 43/0817* (2013.01); *H04L 43/10* (2013.01)

(58) Field of Classification Search
CPC ... H04L 49/557; H04L 41/0668; H04L 43/10; H04L 43/0811; H04L 43/0817
USPC ............ 370/217–228, 241–251; 714/1–4.11
See application file for complete search history.

(56) References Cited

U.S. PATENT DOCUMENTS

| | | | |
|---|---|---|---|
| 6,963,585 B1 | 11/2005 | Pennec et al. | |
| 9,055,081 B2* | 6/2015 | Bonnier | .............. H04L 67/1095 |
| 9,430,262 B1 | 8/2016 | Felstaine et al. | |
| 9,876,739 B2* | 1/2018 | Sivasankar | ........... H04L 49/555 |
| 9,904,585 B1 | 2/2018 | Islam et al. | |
| 10,044,830 B2 | 8/2018 | Otake | |
| 10,083,098 B1 | 9/2018 | Balmakhtar et al. | |

(Continued)

OTHER PUBLICATIONS

Anonymous, "Network Functions Virtualisation (NFV); Reliability; Report on Models and Features for End-to-End Reliability"; ETSI GS NFV-REL 003; V1.1.2, 077-206.

*Primary Examiner* — Thai D Hoang

(57) ABSTRACT

An example operation may include a system comprising one or more of receiving a heartbeat failure notification in a VNFCI when the VNFCI is in standby state, sending to a Virtual Network Function Manager (VNFM), by an operational state machine, a next state request message, determining if a peer VNFCI is online when an administrative state of the peer VNFCI is online, determining an operational state of the peer VNFCI when the peer VNFCI is online, sending a first next state response message with a standby state to the VNFCI when the peer VNFCI operational state is active, sending a second next state response with an active state to the VNFCI when the peer VNFCI operational state is not active, examining, in the VNFCI, a next state attribute in a received next state response message, staying in a standby state when the next state attribute is standby, and transitioning to active state when the next state attribute is active.

20 Claims, 10 Drawing Sheets

(56) References Cited

U.S. PATENT DOCUMENTS

| | | |
|---|---|---|
| 10,237,123 B2 | 3/2019 | Dubey et al. |
| 10,291,543 B1 | 5/2019 | Felstaine et al. |
| 10,547,521 B1 | 1/2020 | Roy et al. |
| 10,693,817 B1 | 6/2020 | Melkild |
| 10,713,071 B2 | 7/2020 | Koo et al. |
| 2003/0235168 A1 | 12/2003 | Sharma et al. |
| 2005/0007964 A1 | 1/2005 | Falco et al. |
| 2006/0056285 A1 | 3/2006 | Krajewski et al. |
| 2006/0168192 A1 | 7/2006 | Sharma et al. |
| 2008/0209136 A1 | 8/2008 | Qi et al. |
| 2008/0285436 A1* | 11/2008 | Robinson ............... H04L 45/00 370/217 |
| 2010/0235488 A1 | 9/2010 | Sharma et al. |
| 2012/0106545 A1* | 5/2012 | Liu ....................... H04L 49/557 370/360 |
| 2012/0240119 A1 | 9/2012 | Xie et al. |
| 2013/0205017 A1* | 8/2013 | Hirose ............... H04L 41/0668 709/224 |
| 2013/0205162 A1* | 8/2013 | Hirose ............... G06F 11/2023 714/4.11 |
| 2014/0073289 A1* | 3/2014 | Velasco ........... H04W 12/04031 455/411 |
| 2015/0063166 A1 | 3/2015 | Sif et al. |
| 2015/0317169 A1 | 11/2015 | Sinha et al. |
| 2016/0103698 A1 | 4/2016 | Yang et al. |
| 2016/0226700 A1 | 8/2016 | Zhang et al. |
| 2016/0226754 A1 | 8/2016 | Zhang et al. |
| 2016/0226762 A1 | 8/2016 | Zhang et al. |
| 2016/0277509 A1 | 9/2016 | Qiang |
| 2016/0328251 A1 | 11/2016 | Bernstein et al. |
| 2016/0328252 A1 | 11/2016 | Singh et al. |
| 2016/0353226 A1 | 12/2016 | Rao et al. |
| 2016/0364226 A1 | 12/2016 | Takano et al. |
| 2016/0366014 A1 | 12/2016 | Koo |
| 2017/0118247 A1 | 4/2017 | Hussain et al. |
| 2017/0139789 A1 | 5/2017 | Fries et al. |
| 2017/0155662 A1 | 6/2017 | Courbon et al. |
| 2017/0195177 A1 | 7/2017 | Farkas et al. |
| 2017/0208011 A1 | 7/2017 | Bosch et al. |
| 2017/0279880 A1 | 9/2017 | Kim et al. |
| 2017/0318087 A1 | 11/2017 | Qiu et al. |
| 2017/0332424 A1 | 11/2017 | Salot et al. |
| 2017/0345281 A1 | 11/2017 | Shaw |
| 2017/0374562 A1* | 12/2017 | Jeon ..................... H04W 76/15 |
| 2018/0013586 A1 | 1/2018 | Wang |
| 2018/0013680 A1 | 1/2018 | Bull et al. |
| 2018/0063018 A1 | 3/2018 | Bosch et al. |
| 2018/0083850 A1 | 3/2018 | Rabipour et al. |
| 2018/0101397 A1 | 4/2018 | Sergeev |
| 2018/0123870 A1 | 5/2018 | Xue et al. |
| 2018/0139107 A1 | 5/2018 | Senarath et al. |
| 2018/0152347 A1 | 5/2018 | Dhandu et al. |
| 2018/0153698 A1 | 6/2018 | Rindal et al. |
| 2018/0176073 A1 | 6/2018 | Dubey et al. |
| 2018/0205786 A1 | 7/2018 | Dong et al. |
| 2018/0234288 A1 | 8/2018 | Soderlund |
| 2018/0253332 A1 | 9/2018 | Andrianov et al. |
| 2018/0307539 A1 | 10/2018 | Celozzi et al. |
| 2018/0352007 A1 | 12/2018 | Caldwell et al. |
| 2018/0375392 A1 | 12/2018 | Gieras et al. |
| 2019/0028350 A1 | 1/2019 | Yeung et al. |
| 2019/0044838 A1 | 2/2019 | Yao et al. |
| 2019/0052520 A1 | 2/2019 | Luo |
| 2019/0132330 A1 | 5/2019 | Celozzi et al. |
| 2019/0146884 A1 | 5/2019 | Gangadharappa et al. |
| 2019/0149397 A1 | 5/2019 | Celozzi et al. |
| 2019/0155632 A1 | 5/2019 | Toy |
| 2020/0004572 A1 | 1/2020 | Faynberg et al. |
| 2020/0007629 A1 | 1/2020 | Tse et al. |
| 2020/0034180 A1 | 1/2020 | Hoshino |

\* cited by examiner

US 10,972,409 B1

VNFM ASSISTED FAULT HANDLING IN VIRTUAL NETWORK FUNCTION COMPONENTS

FIELD OF INVENTION

This application generally relates to fault tolerance of Virtual Network Function Components (VNFCs). More specifically, the application relates to methods, systems, components and computer readable media for detecting and handling faults in VNFCs utilizing Active/Standby fault tolerance in a system employing a Network Function Virtualization (NFV) architecture.

BACKGROUND OF THE INVENTION

The NFV architecture offers a way to design and deploy telecommunication network functions. In the past, these functions have been tightly coupled to the proprietary hardware on which they execute. NFV decouples the software implementation of these functions from the underlying infrastructure. The software typically runs in virtual machines or containers, under the control of a hypervisor or operating system which run on commercial off-the-shelf (COTS) servers. This approach has the promise of significant reductions in capital and operational expenses for service providers as custom hardware is no longer required and scaling is provided through additional software deployments, not a provisioning of new physical equipment.

The European Telecommunications Standard Institute (ETSI) network functions virtualization (NFV) industry specification group (ISG) has defined a reference NFV architecture. However, the details of many important aspects of the functionality are not described or specified.

SUMMARY OF THE INVENTION

In an NFV architected system, functions that were tied to specialized hardware in the past are decoupled so that their software implementations can be executed in virtualized containers running on COTS hardware. These decupled software implementations are called Virtual Network Functions (VNFs). Each of these functions is made up of one or more software components which are known as VNF Components (VNFCs). The details of how faults are detected in VNFCs is not described or specified in current specifications. As a large percentage of existing telecommunication functions being ported to NFV rely on Active/Standby fault tolerance, there exists a need for fault detection and handling in VNFCs utilizing Active/Standby fault tolerance in an NFV system.

One example embodiment may include a system, comprising one or more of receiving a heartbeat failure notification in a VNFCI when the VNFCI is in standby state, sending to a Virtual Network Function Manager (VNFM), by an operational state machine, a next state request message, determining if a peer VNFCI is online when an administrative state of the peer VNFCI is online, determining an operational state of the peer VNFCI when the peer VNFCI is online, sending a first next state response message with a standby state to the VNFCI when the peer VNFCI operational state is active, sending a second next state response with an active state to the VNFCI when the peer VNFCI operational state is not active, examining, in the VNFCI, a next state attribute in a received next state response message, staying in a standby state when the next state attribute is standby, and transitioning to active state when the next state attribute is active.

Another example embodiment may provide a method comprising one or more of receiving a heartbeat failure notification in a VNFCI when the VNFCI is in standby state, sending to a VNFM, by an operational state machine, a next state request message, determining if a peer VNFCI is online when an administrative state of the peer VNFCI is online, determining an operational state of the peer VNFCI when the peer VNFCI is online, sending a first next state response message with a standby state to the VNFCI when the peer VNFCI operational state is active, sending a second next state response with an active state to the VNFCI when the peer VNFCI operational state is not active, examining, in the VNFCI, a next state attribute in a received next state response message, staying in a standby state when the next state attribute is standby, and transitioning to active state when the next state attribute is active.

Another example embodiment may provide a non-transitory computer readable medium comprising instructions, that when read by a processor, cause the processor to perform one or more of receiving a heartbeat failure notification in a VNFCI when the VNFCI is in standby state, sending to a VNFM, by an operational state machine, a next state request message, determining if a peer VNFCI is online when an administrative state of the peer VNFCI is online, determining an operational state of the peer VNFCI when the peer VNFCI is online, sending a first next state response message with a standby state to the VNFCI when the peer VNFCI operational state is active, sending a second next state response with an active state to the VNFCI when the peer VNFCI operational state is not active, examining, in the VNFCI, a next state attribute in a received next state response message, staying in a standby state when the next state attribute is standby, and transitioning to active state when the next state attribute is active.

DETAILED DESCRIPTION OF THE INVENTION

Figure 1:
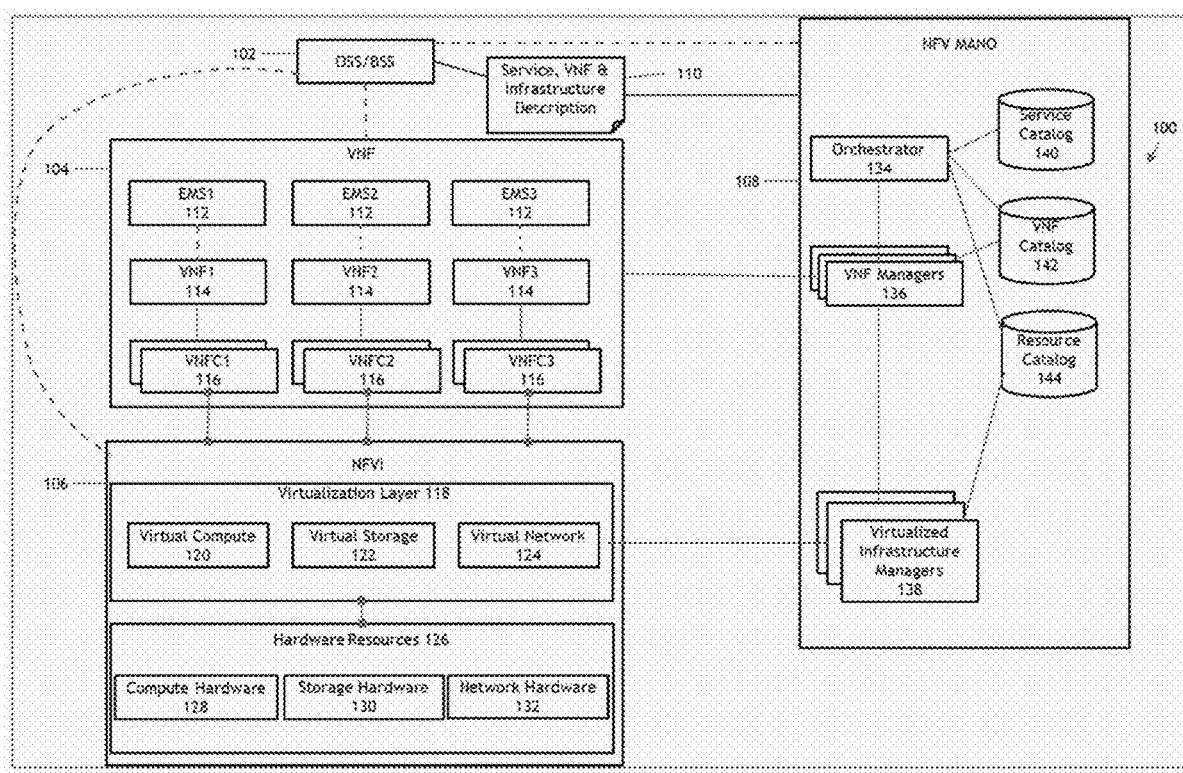
FIG. 1 is a diagram of an embodiment of a network function virtualization framework in accordance with one or more embodiments.

It will be readily understood that the instant components and/or steps, as generally described and illustrated in the figures herein, may be arranged and designed in a wide variety of different configurations. Thus, the following detailed description of the embodiments of at least one of a method, system, component and non-transitory computer readable medium, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Disclosed herein are various embodiments for implementing and/or utilizing Active/Standby fault tolerance in VNFs. A VNF is the implementation of a network function that can be deployed in an NFV architecture. VNFs can be viewed as service building blocks which may be used by one or more Network Services (NSs). Examples of VNFs include, but are not limited to, firewall, application acceleration, Deep Packet Inspection (DPI), Session Initiation Protocol (SIP) user agent, and Network Address Translation (NAT).

Each VNF specifies its deployment and operational behavior in a deployment template known as a VNF Descriptor. A VNF may be implemented using one or more VNF Components (VNFCs). A VNFC is an internal component of a VNF that provides a subset of that VNF's functionality. The main characteristic of a VNFC is that it maps 1:1 with a Virtual Machine (VM) or operating system container when the function is deployed. Please note the terms VNF and VNFC may be used interchangeably herein.

A VNF instance (VNFI) is a run-time instantiation of the VNF software resulting from completing the instantiation of its VNFCs and the connectivity between them. As multiple instances of a VNF can exist in the same domain, the terms VNF and VNF Instance (VNFI) may be used interchangeably herein. Similarly, VNFC instance (VNFCI) is a run-time instantiation of a VNFC deployed in a particular VM or container. It has a lifecycle dependency with its parent VNFI. As multiple instances of a VNFC can exist in the same domain, the terms VNFC and VNFC Instance (VNFCI) may also be used interchangeably herein.

FIG. 1 is a diagram of a network function virtualization framework 100 for implementing NFV in accordance with one or more embodiments of the present application. The NFV framework 100 comprises an operating support system (OSS)/business support system (BSS) module 102, a VNF module 104, a network function virtualization infrastructure (NFVI) model 106, and an NFV management and orchestration (MANO) module 108. A module may be a virtual element, a physical network element or embedded in a physical network element and may consist of hardware, software, firmware and/or a combination of one or more of hardware, software, and firmware. The OSS/BSS module 102 is configured to support management functions such as network inventory, service provisioning, networking configurations, and fault management. Further, the OSS/BSS module 102 is configured to support end-to-end telecommunication services. The OSS/BSS module 102 is configured to interact with the VNF module 104, the NFVI module 106 and the NFV MANO module 108. The VNF module 104 may comprise element management systems (EMSs) 112, VNFs 114 and VNFCs 116. The EMSs 112 may be applicable to specific VNFs and are configured to manage one or more VNFs 114 which may be composed of one or more VNFCs 116.

In one embodiment, the VNF module 104 may correspond with a network node in a system and may be free from hardware dependency. The NFVI module 106 is configured to provide virtual compute, storage and network resources to support the execution of the VNFs. The NFVI module 106 may comprise COTS hardware, accelerator components where necessary and/or a software layer which virtualizes and abstracts underlying hardware. For example, the NFVI module 106 may comprise one or more of a virtual compute module 120, a virtual storage module 122, a virtual networking module 124 and a virtualization layer 118. The virtualization layer 118 may be operably coupled to hardware resources 126 including, but not limited to compute hardware 128, storage hardware 130 and network hardware 132. The NFV MANO module 108 is configured to orchestrate and to manage physical and/or software resources that support the infrastructure virtualization. The NFV MANO module 108 is configured to implement virtualization specific management tasks for the NFV framework 100. The NFV MANO module 108 may be driven by a set of metadata 110 that describes services, VNFs, VNFCs, and infrastructure requirements. The metadata 110 is owned by and stored in the OSS/BSS 102, but is used to interwork with the MANO module 108.

In one embodiment, the NFV MANO module comprises an orchestrator module 134, a VNF manager (VNFM) 136, and a virtualized infrastructure manager (VIM) 138. The orchestrator module 134, the VNFM 136 and the VIM 138 are configured to interact with each other. Further, the VNFM 136 may be configured to interact with and to manage the VNF module 104 and the VIM 138 may be configured to interact with and manage the NFVI module 106. The orchestrator module 134 is responsible for the lifecycle management of network services. Supported lifecycle operations include one or more of instantiating, scaling, updating and terminating network services. The VNFM 136 is responsible for the lifecycle management for a set of VNFs 114 and all of their components (VNFCs) 116. Supported lifecycle operations include one or more of instantiating, scaling, updating and terminating VNFs. A VNFM may manage one or more types of VNFs 114. The VIM 138 is responsible for controlling and managing NFVI 106 compute, storage and network resources usually within an operator's infrastructure domain. Additionally, VIMs 138 may be partitioned based on an operator's Points of Presence (PoPs), i.e. physical locations. The service catalog 140, stores the network services which are managed by the orchestrator module 134. Each stored service may include, but is not limited to, metadata associated with the service 110 and service specific software bundles. The VNF catalog 142 stores the VNFs which are used to build network services. Each stored VNF may include, but is not limited to, VNF metadata 110 and VNF software bundles. This catalog is accessed by both the orchestrator module 134 and VNFM Managers 136. The resource catalog 144 stores the list of virtual and physical infrastructure resources in the NFVI 106 including the mapping between them. This catalog is accessed by both the orchestrator module 134 and the VIMs 138.

Figure 2:
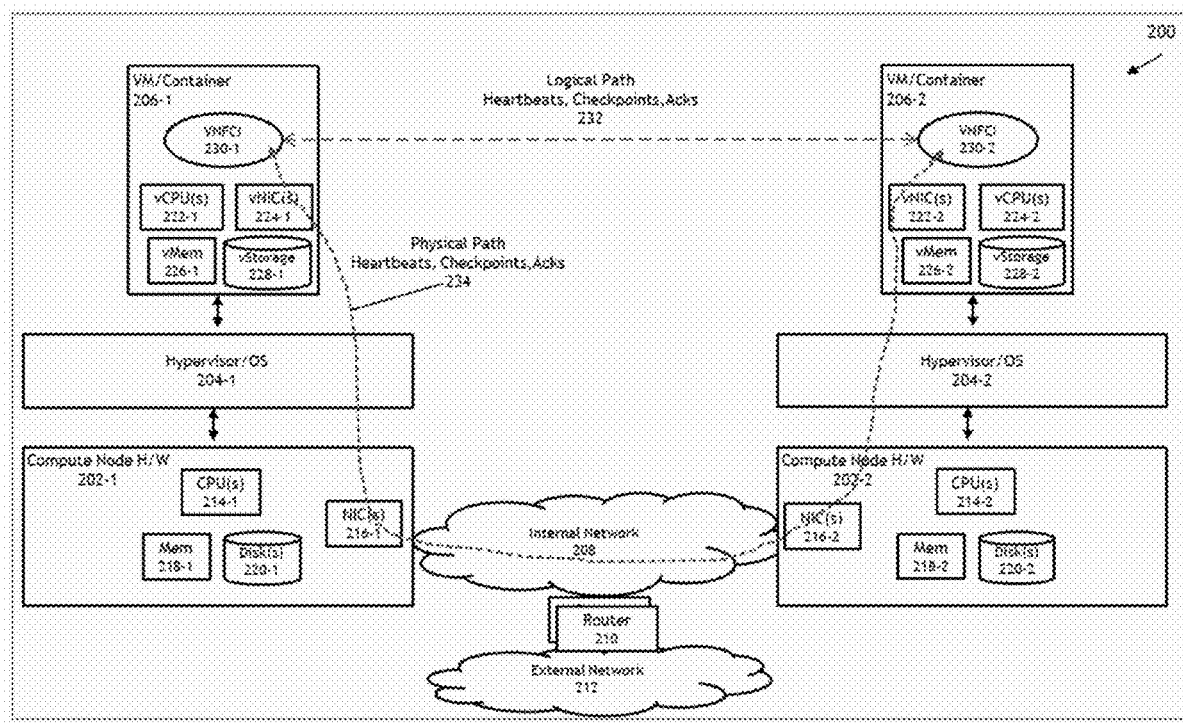
FIG. 2 is a diagram of an embodiment of a VNF system hosting a VNFC using Active/Standby fault tolerance in accordance with one or more embodiments.

FIG. 2 illustrates a VNF system 200 hosting a VNFC using Active/Standby fault tolerance in accordance with one or more embodiments of the present application. The VNF system 200 is comprised of at least two physical compute nodes 202-1 and 202-2. In one embodiment, the compute nodes 202-1 and 202-2 host hypervisors 204-1 and 204-2, which in turn manage one or more Virtual Machines (VMs) 206-1 and 206-2. In another embodiment, the compute nodes 202-1 and 202-2, host operating systems (OSs) 204-1 and 204-2, which manage containers 206-1 and 206-2. Both embodiments provide virtualization environments in which the VNF Component Instances (VNFCIs) 230-1 and 230-2 execute. As the virtualization environment provided by both embodiments is sufficient for execution, the two embodiments should be considered interchangeable herein. Further, the embodiments used on compute nodes 202-1 and 202-2 may not match. For example, compute node 202-1 may use hypervisor-based virtualization while compute node 202-2 may utilize operating system container based virtualization.

Each compute node 202-1 and 202-2 is comprised of a Central Processing Unit (CPU) module 214-1 and 214-2, a memory module 218-1 and 218-2, a disk module 220-1 and 220-2 and a network interface card (NIC) module 216-1 and 216-2. It should be noted that the capabilities of the hardware resources (CPU, Memory, Disks, NIC, etc.) of compute nodes 202-1 and 202-2 may not be identical. As further shown in FIG. 2, NICs 216-1 and 216-2 communicate network packets via a physical internal network 208, where in accordance with one or more preferred embodiments network 208 may be a private network. The internal network may be connected to an external physical network 212 via, for example, one or more network routers 210.

Each VM/container 206-1 and 206-2 is comprised of a series of virtual resources that map to a subset of the physical resources on the compute nodes 202-1 and 202-2. Each VM/container is assigned one or more virtual CPUs (vCPUs) 222-1 and 222-2, an amount of virtual memory (vMem) 226-1 and 226-2, an amount of virtual storage (vStorage) 228-1 and 228-2 and one or more virtual NICs (vNIC) 224-1 and 224-2. A vCPU 222-1 and 222-2 represents a portion or share of a physical CPU 214-1 and 214-2 that are assigned to a VM or container. A vMem 226-1 and 226-2 represents a portion of volatile memory (e.g. Random Access Memory) 218-1 and 218-2 dedicated to a VM or container. The storage provided by physical disks 220-1 and 220-2 are divided and assigned to VMs/containers as needed in the form of vStorage 228-1 and 228-2. A vNIC 224-1 and 224-2 is a virtual NIC based on a physical NIC 216-1 and 216-2. Each vNIC is assigned a media access control (MAC) address which is used to route packets to an appropriate VM or container. A physical NIC 216-1 and 216-2 can host many vNICs 224-1 and 224-2.

A VNFC instance (VNFCI) 230-1 and 230-2 executes in each VM/containers 206-1 and 206-2. In accordance with one or more embodiments of the present application, a VNFC that utilizes Active/Standby fault tolerance, will have two or more VNFCIs 230-1 and 230-2 running in a VNF system 200. An instance will be in an Active state, performing one or more of servicing requests, sending heartbeats, acknowledging heartbeats, and sending application state checkpoints to a peer instance in the Standby state. Another instance (peer instance), will be in the Standby state, performing one or more of acknowledging heartbeats, sending heartbeats and receiving and processing application state checkpoints. Logically, these messages 232 travel between VNFCIs 230-1 and 230-2. During execution, these messages 234 actually travel through NICs 216-1 and 216-2 and internal network 208 before being delivered to VNFCIs 230-1 and 230-2.

Figure 3:
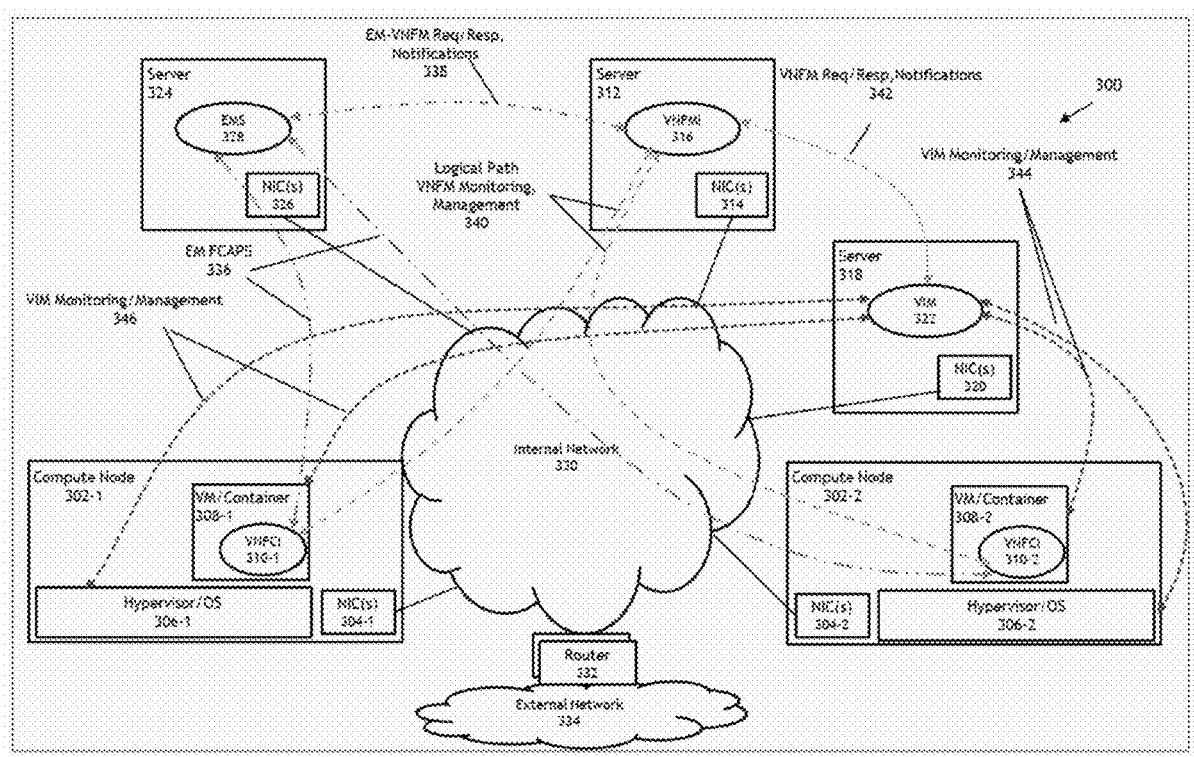
FIG. 3 is a diagram of an embodiment of a management Focus version of FIG. 2 in accordance with one or more embodiments.

In accordance with one or more embodiments of the present application, FIG. 3 illustrates the NFV system 300, originally depicted in FIG. 2, but with a focus on management elements and communication. The VNF system 300 is comprised of at least two physical compute nodes 302-1 and 302-2. In one embodiment, the compute nodes 302-1 and 302-2 host hypervisors 306-1 and 306-2, which in turn manage one or more Virtual Machines (VMs) 308-1 and 308-2. In another embodiment, the compute nodes 302-1 and 302-2, host operating systems (OSs) 306-1 and 306-2, which manage containers 308-1 and 308-2. Both embodiments provide virtualization environments in which the VNF Component Instances (VNFCIs) 310-1 and 310-2 execute.

As further shown in FIG. 3, NICs 304-1 and 304-2 communicate network packets via a physical internal network 330, where in accordance with one or more preferred embodiments, network 330 may be a private network. The internal network may be connected to an external physical network 334 via one or more network routers 332.

In one embodiment, a server 324 hosts an EMS 328 which is responsible for one or more of fault, configuration, accounting, performance and security (FCAPS) of one or more VNFCIs 310-1 and 310-2. The server 324 has one or more NICs 326 which provide connectivity to an internal network 330 over which FCAPS related messages 336 travel. There may be many EMSs in a system 300. An EMS 328 sends and receives FCAPS messages 336 from all VNFCIs 310-1 and 310-2 that it is managing. In one embodiment, the messaging 336 includes operational state notifications from the VNFCIs 310-1 and 310-2 that it is managing. In another embodiment, the state notification messages 336 do not come directly from the VNFCIs 310-1 and 310-2, but instead come from the VNFM 316. In one embodiment, that messaging 336 includes fault notifications from the VNFCIs 310-1 and 310-2 that it is managing. In another embodiment, the fault notification messages 336 do not come directly from the VNFCIs 310-1 and 310-2, but instead come from the VNFM 316 via notification messages 338.

In accordance with one or more embodiments of the present application, a server 312 hosts a VNFM 316 which is responsible for managing the lifecycle of one or more VNFCIs 310-1 and 310-2. The server 312 has one or more NICs 314 which provide connectivity to an internal network 330 over which lifecycle management and monitoring related messages 340 travel. A VNFM 316 sends and receives lifecycle management and monitoring messages 340 to/from all VNFCIs 310-1 and 310-2 that it is managing. In one embodiment, that messaging 340 includes operational state notifications from the VNFCIs 310-1 and 310-2 that it is managing. Further, the VNFM 316 may relay those notifications messages 340 to an EMS 328 associated with the VNFCIs 310-1 and 310-2 using notification messages 338. In another embodiment, a VNFCI 310-1 or 310-2 requests the status of another VNFCI 310-1 or 310-2 from a VNFM 316 via a message 340 so that it can make a decision on which operational state to take. In an alternative embodiment, a VNFCI 310-1 or 310-2 requests a decision on which operational state to take from a VNFM 316, via a message 340. In another embodiment, a VNFCI 310-1 and 310-2 notifies a VNFM 316 via a message 340 that it has detected that another VNFCI 310-1 and 310-2 has a fault.

As further shown in FIG. 3, an EMS 328 may issue lifecycle management requests concerning VNFCIs 310-1 and 310-2 to a VNFM 316 via messaging 338. Examples of these requests include one or more of deploy, start, stop, undeploy and migrate. A VNFM 316 may work with a VIM 322 and one or more VNFCIs 310-1 and 310-2, once running, to accomplish these requests. The status of these requests may be conveyed in direct response and state change notification messages 338 to the EMS 328. In another embodiment, these lifecycle requests may come from an orchestrator module 134 (as shown in FIG. 1).

In one embodiment, a server 318 hosts a VIM 322 which is responsible for managing the virtualized infrastructure of the NFV System 300. The server 318 has one or more NICs 320 which provide connectivity to an internal network 330 over which VIM monitoring and management related messages 326 travel. There may be many VIMs 322 in a system 300. In one embodiment, a VIM 322 receives infrastructure management request messages 342 from a VNFM 316. In order to fulfill a request, a VIM 322 may need to manage a compute node 302-1 and 302-2, hypervisor/OS 306-1 and 306-2, VM 308-1 and 308-2, network 330 switch, router 332 or any other physical or logical element that is part of the NFV System 300 infrastructure. A VIM sends messages 344 and 346 to manage and monitor a hypervisor/operating system 306-1 and 306-2 and a VM 308-1 and 308-2 associated with a VNFCI 310-1 and 310-2. Examples of these messages include, but are not limited to, requests to create a VM, destroy a VM, move a VM, monitor a running VM, monitor a hypervisor and monitor an OS. In another embodiment, these messages come from an orchestrator module 134 (as shown in FIG. 1). In one embodiment, a VIM 322 will query the states of requisite logical and physical elements when an infrastructure management request is received from a VNFM 316. This embodiment may not be efficient however given the elapsed time between state requests and responses. In another embodiment, a VIM 322 will keep a current view of the states of all physical and logical elements that it manages in order to enable efficient processing when element states are involved. Further, it is expected that a VNFM 316 will maintain a cache of those element states that are associated with VNFCIs 310-1 and 310-2 that it is managing, in order to enable efficient processing when element states are involved.

Figure 4:
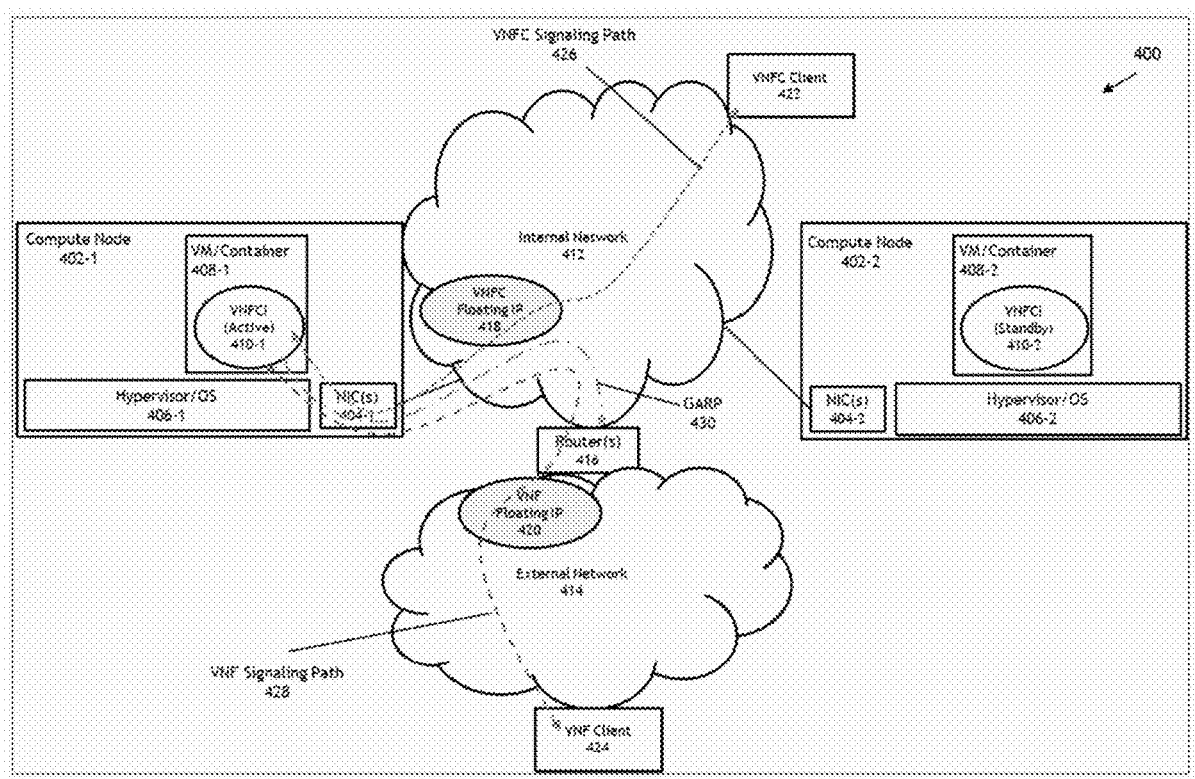
FIG. 4 is a diagram of an embodiment of a signaling focus version of FIG. 2 in accordance with one or more embodiments.

In accordance with one or more embodiments of the present application, FIG. 4 illustrates the NFV system 400, originally depicted in FIG. 2, but with a focus on signaling communication. The VNF system 400 is comprised of at least two physical compute nodes 402-1 and 402-2. In one embodiment, the compute nodes 402-1 and 402-2 host hypervisors 406-1 and 406-2, which in turn manage one or more Virtual Machines (VMs) 408-1 and 408-2. In another embodiment, the compute nodes 402-1 and 402-2, host operating systems (OSs) 406-1 and 406-2, which manage containers 408-1 and 408-2. Both embodiments provide virtualization environments in which the VNF Component Instances (VNFCIs) 410-1 and 410-2 execute. As further shown in FIG. 4, NICs 404-1 and 404-2 communicate network packets via a physical internal network 412, where in accordance with one or more preferred embodiments, network 418 may be a private network. The internal network may be connected to an external physical network 414 via one or more network routers 424. In accordance with one or more preferred embodiments network 424 may be a public network.

As depicted in FIG. 3, a VNFCI 410-1 and 410-2 may be associated with one or more floating IP addresses 418 and 420 that are part of an internal network 412 or an external network 414. This is required in most cases when a VNFC employs Active/Standby fault tolerance as the IP addresses 418 and 420 VNFC clients 422 and 424 use for exchanging messages must route to the Active VNFCI 410-1. In one embodiment, a VNFC is associated with a floating IP address 418 on an internal network 412, which internal VNFC clients use when exchanging messages 426 with it. Further, the VNFC client 422 may be another VNFC. In another embodiment, a VNFC is associated with a floating IP address 420 on an external network 414, which external VNFC clients 424 use when exchanging messages 428 with it.

As depicted in FIG. 1, a VNF 114 may be comprised of many VNFCs 116. Additionally, a VNF 114 may be associated with one or more signaling IP addresses. In such a case, one of the VNFCs must be designated as the manager of the addresses. Therefore, in one embodiment, a VNFC has one or more VNFCIs 410-1 and 410-2 which are associated with one or more signaling IP addresses 418 and 420 associated with and provisioned against a VNF 114, but managed by a particular VNFCI 410-1 and 410-2.

In accordance with one or more embodiments of the present application, a VNFCI 410-1 sends a resource allocation request to a VIM 322 (see FIG. 3) which in turns sends one or more configuration requests to network routers 416 in order to associate a floating IP address 418 and 420 with the VNFCI, specifically the VM/container 408-1 in which it runs. In one embodiment, a VNFCI 410-1 sends a resource allocation request to a VNFM (FIG. 3, 316) which in turns makes the request of a VIM 322 to associate a floating IP address 418 and 420 with the VNFCI. In another embodiment, a VNFCI 410-1 sends one or more Gratuitous Address Resolution Protocol (GARP) requests 430 to a VM/container 408-1 which forwards the request through a vNIC 224-1 (see FIG. 2) to the physical NIC 404-1 and out to the network routers 416 in order to associate a floating IP address 418 and 420 with the VNFCI.

Figure 5:
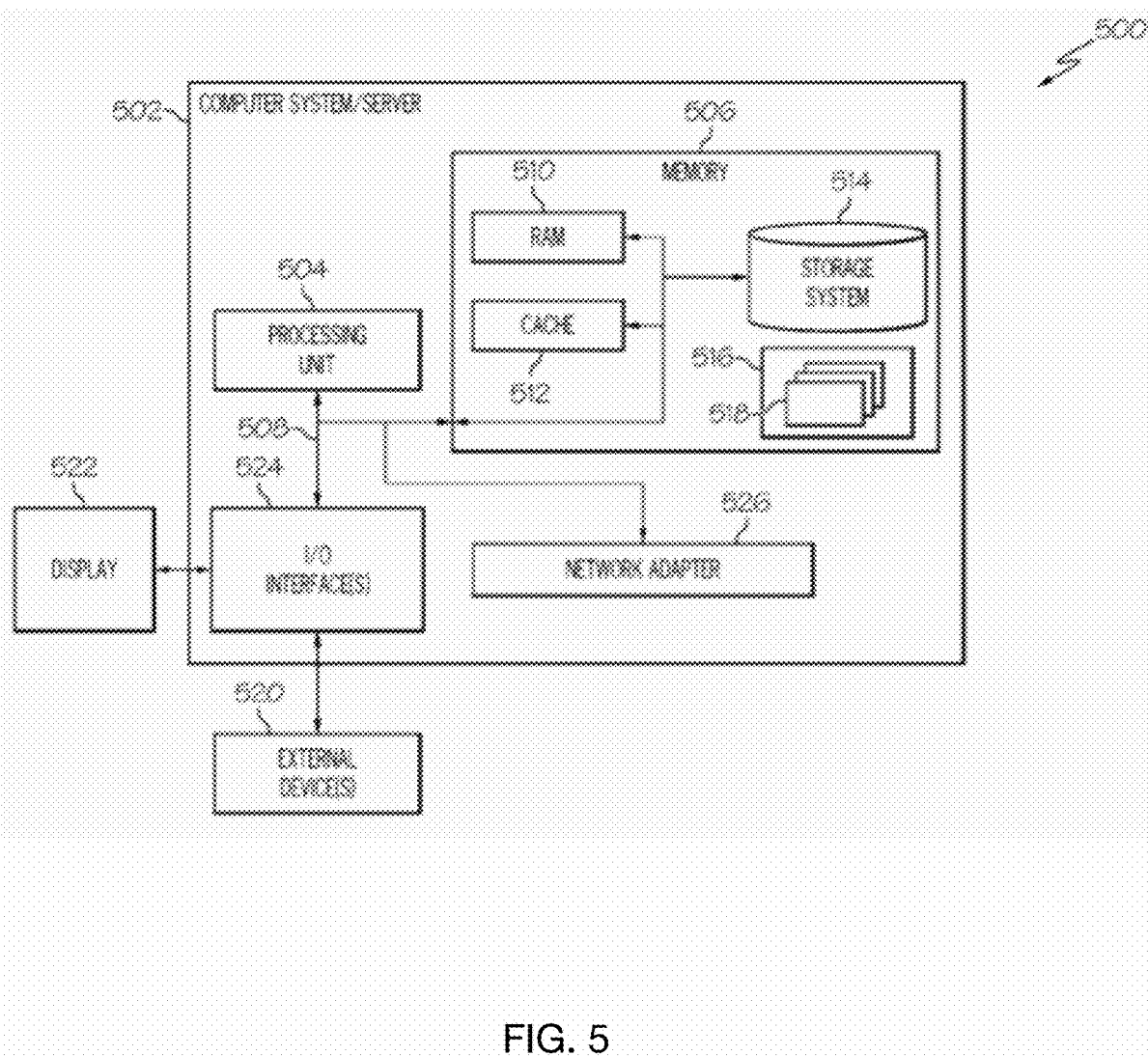
FIG. 5 is a diagram of an embodiment of a standard hardware diagram in accordance with one or more embodiments.

FIG. 5 illustrates one example of a computing node 500 to support one or more of the example embodiments. This is not intended to suggest any limitation as to the scope of use or functionality of the embodiments described herein. Regardless, the computing node 500 is capable of being implemented and/or performing any of the functionalities or embodiments set forth herein.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose computing device. The components of computer system/server 502 may include, but are not limited to, one or more processors or processing units 504, a system memory 506, and a bus 508 that couples various system components including system memory 506 to processor 504.

Bus 508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and nonvolatile media, removable and non-removable media.

The system memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CDROM, DVD-ROM or other optical media can be provided. In such instances, each can be connected to bus 508 by one or more data media interfaces. As will be further depicted and described below, memory 506 may include at least one program product having a set (e.g., at least one) of program modules that are configured to carry out the functions of various embodiments as described herein.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments as described herein.

Aspects of the various embodiments described herein may be embodied as a system, method, component or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via bus 508. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

In general, the routines executed to implement the embodiments, whether implemented as part of an operating system or a specific application; component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, causes that computer to perform the steps necessary to execute steps or elements embodying the various aspects of the embodiments. Moreover, while the embodiments have and herein will be described in the context of fully functioning computers and computer systems, the various embodiments are capable of being distributed as a program product in a variety of forms, and that the embodiments apply equally regardless of the particular type of computer readable media used to actually carry out the distribution. Examples of computer readable media include but are not limited to physical, recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various program code described herein may be identified based upon the application or software component within which it is implemented in specific embodiments. However, it should be appreciated that any particular program nomenclature used herein is merely for convenience, and thus the embodiments should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the embodiments are not limited to the specific organization and allocation of program functionality described herein.

The exemplary environment illustrated in FIG. 5 is not intended to limit the present embodiments. Indeed, other alternative hardware and/or software environments may be used without departing from the scope of the embodiments described herein.

Figure 6:
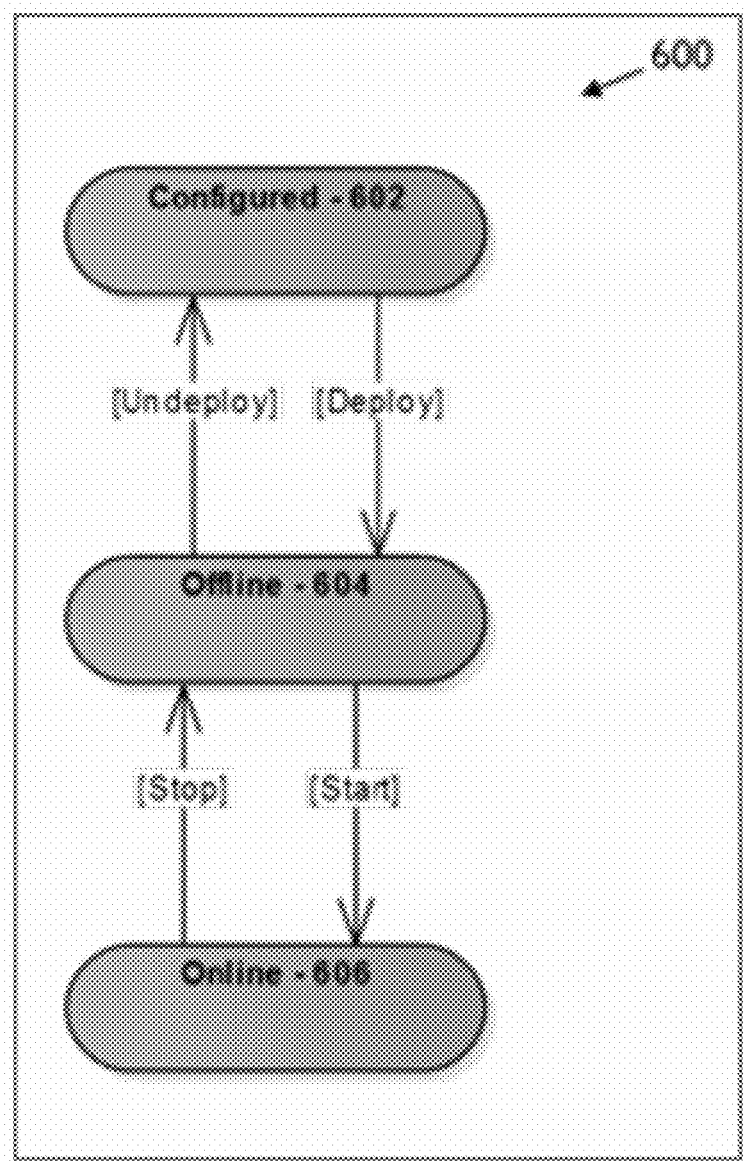
FIG. 6 is a diagram of an embodiment of a VNFCI administrative state diagram in accordance with one or more embodiments.

In accordance with one or more embodiments of the present application, FIG. 6 illustrates an administrative state machine diagram of a VNFCI. In one embodiment, the VNFCI administrative state machine 600 is a software component of a VNFM that controls the administrative state of a VNFCI. In another embodiment, the VNFCI administrative state machine 600 is a software component of an EMS that controls the administrative state of a VNFCI. As the VNFCI administrative state machine is the same in both cases, the two embodiments should be considered interchangeable herein. The administrative state reflects the desired state of a VNFCI from an administrator or other individual/entity/process perspective. The state machine includes states that are required to support configuration, deployment and/or start operations. The administrative state is a different plane of state from the VNFCI operational state (the actual execution state of a running instance) which will be discussed in FIG. 7.

A VNFCI administrative state machine 600, starts in the Configured 602 state when a VNFCI is configured in an NFV system 100 (See FIG. 1). At this point, the only representation of the instance is in the elements where the instance configuration is stored. In one embodiment, the VNFCI configuration is stored in a VNF Catalog 142 (See FIG. 1). In another embodiment, the VNFCI configuration is stored in an EMS 112 (See FIG. 1). In yet another embodiment, the VNFCI configuration is stored with another element within NFV MANO 108. Once configured, a VNFCI may be deployed. Any software, configuration data, etc. that is required to execute the VNFCI is electronically transferred by a VNFM 316 (See FIG. 3) to a hosting VM/OS container 308-1 or 308-2 (See FIG. 3) on an NFVI compute node 302-1 or 302-2 (See FIG. 3). This type of operation may be needed in support of management activities including, but not limited to, initial commissioning, software upgrades and host migration. Once the deployment process has successfully been completed, the VNFCI administrative state machine 600 on the managing VNFM 316 (See FIG. 3) is transitioned into an Offline 604 state. In this state, a VNFCI is ready to be started, but is not currently running. Upon receiving a VNFCI start request from an EMS 328 (See FIG. 3) or an Orchestrator 134 (See FIG. 1), the VNFM 316 (See FIG. 3), transitions the VNFCI administrative state machine to the Online 606 state and sends a start request to the VM/container 302-1 or 302-2 (See FIG. 3) that is hosting the target VNFCI 310-1 or 310-2 (See FIG. 3). Upon receiving the start request from the VNFM 316 (See FIG. 3), the hosting VM/container 302-1 or 302-2 (See FIG. 3) actually starts the VNFCI 310-1 or 310-2 (See FIG. 3). It is important to understand that an administrative state of Online 606 does not imply that a VNFCI is actually executing. A VNFCI could fail during startup process or at a later point in time. In either case, the administrative state remains the same—Online 606. Once in the Online 606 administrative state, another VNFCI plane of state, the operational state, becomes relevant. Operational states are described in in FIG. 7.

When a VNFM 316 (See FIG. 3) that is managing a VNFCI that is the Online 606 state receives a stop request for that VNFCI, the VNFCI administrative state machine 600 is transitioned into the Offline state 604. Additionally, a stop request is sent from the VNFM 316 (See FIG. 3) to the VNFCI 310-1 or 310-2 (See FIG. 3). In one embodiment, the stop request is sent from the managing VNFM 316 (See FIG. 3) directly to a VNFCI 310-1 or 310-2 (See FIG. 3). In another embodiment, a stop request is sent from a VNFM 316 (See FIG. 3) to the hosting VM/OS container 302-1 or 302-2 (See FIG. 3), which stops the VNFCI 310-1 or 310-2 (See FIG. 3).

When a VNFM 316 (See FIG. 3) that is managing a VNFCI 310-1 or 310-2 (See FIG. 3) that is in the Offline 604 state receives an undeploy request for that VNFCI, all software, data, etc. previously transferred to the VM/OS container 302-1 or 302-2 (See FIG. 3) during deployment is removed from the VM/container 302-1 or 302-2 (See FIG. 3) by one or more commands/scripts/other software components initiated by the VNFM 316 (See FIG. 3), but executed within the VM/container 302-1 or 302-2 (See FIG. 3). This type of operation may be needed in support of management activities including, but not limited to, software upgrades and host migration. Once this operation is complete, the VNFM transitions the VNFCI administrative state machine 600 into the Configured state 602.

Figure 7:
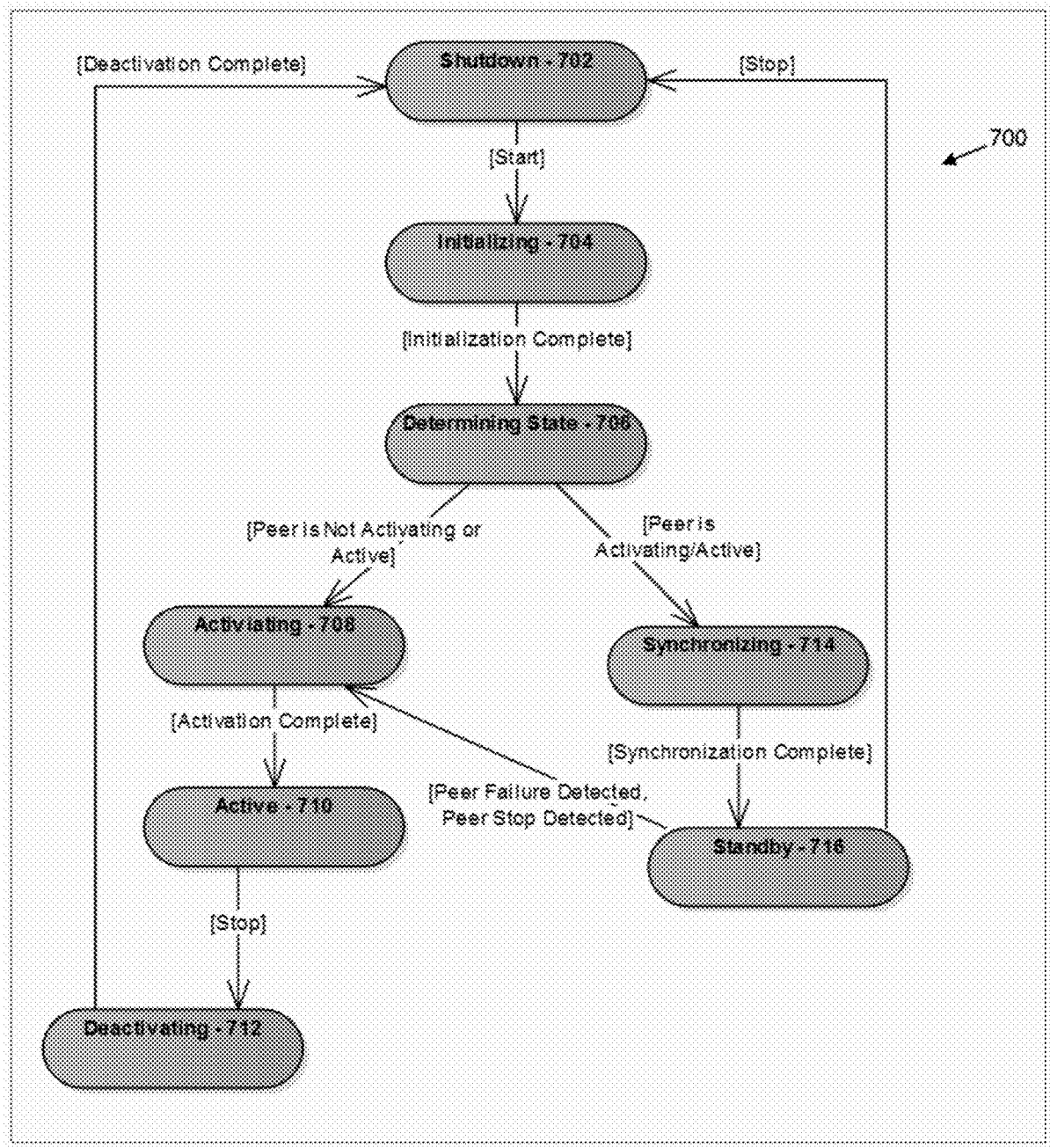
FIG. 7 is a diagram of an embodiment of a VNFCI operational state diagram in accordance with one or more embodiments.

In accordance with one or more embodiments of the present application, FIG. 7 illustrates an operational state machine diagram of a VNFCI that employs Active/Standby fault tolerance. The VNFCI operational state machine is a base software component of a VNFC that controls the operational state of the software instance. The VNFCI operational state machine 700, starts out in the Shutdown state 702. In this initial state, the VNFCI executable has not been started. When the VM/container that hosts the VNFCI receives a start VNFCI request from a VM/container, the VNFCI executable, which is stored on a VM/container filesystem, is launched and the operational state machine transitions into the Initializing state 704. In this state, a VNFCI performs any one-time initialization of resources that it may need such as, but not limited to, software subsystems, objects and memory. In one embodiment, one of the software subsystems is an EMS state notification subsystem. This subsystem communicates all operational state changes that occur in state machine 700 to an associated EMS. In another embodiment, one of the software subsystems is a VNFM state notification subsystem. This subsystem communicates all operational state changes that occur in state machine 700 to an associated VNFM. One software subsystem that is present is a peer state subsystem which enables the VNFCI to determine the state of its peer VNFCI if at all possible. In one embodiment, this may be a heartbeat subsystem that exchanges messages with a peer VNFCI. In another embodiment, this may be a subsystem that consults with a VNFM to determine the state of a peer VNFCI. In yet another embodiment, this may be a subsystem that consults with an EMS to determine the state of a peer VNFCI.

Once initialization is complete, the operational state machine transitions into the Determining-State state 706. In this phase, the VNFCI needs to determine whether it should transition into an Active state 710 to provide service or transition into a Standby state 716 in order to act as a backup. At this point, the peer state subsystem is consulted in order to determine the peer VNFCI operational state. This operation may take some time as messages such as heartbeats may need to be exchanged. If the peer operational state can be determined and is not Activating 708 or Active 710, then this VNFCI transitions into the Activating state 708. If the peer operational state cannot be determined, then the VNFCI also transitions into the Activating state 708.

In the Activating state 708, the VNFCI instructs all software subsystems to perform any actions necessary in order to activate. This may include, but are not limited to operations such as creating a queue, opening a communications port and starting a thread of execution. Additionally, it is during this phase that any "floating" IP addresses 418 and 420 (see FIG. 4)) are associated with this VNFCI. In accordance with one or more embodiments of the present application, and as discussed in FIG. 4, this may be accomplished by making a resource allocation request to a VIM and/or issuing a series of GARP requests.

Once activation is complete, the operational state machine transitions into the Active state 710. In this state, the VNFCI is capable of performing its intended function. All service requests from VNFC clients 422 (see FIG. 4,) and/or VNF clients 424 (see FIG. 4) are routed to it via networks 412 and 414 (see FIG. 4). In one embodiment, the VNFC is "stateful", so while in the Active state 710, the VNFCI sends service state checkpoints as needed to a peer VNFCI instance 410-2 (see FIG. 4) in the Synchronizing state 714 or Standby state 716. If the peer VNFCI is in the synchronizing state, new state checkpoints may be queued and later sent once synchronization is complete and the VNFCI has transitioned into the Standby state 716.

Under normal operating conditions, the VNFCI will remain in the Active state 710 until a maintenance event occurs. Examples of maintenance events include, but are not limited to, a software upgrade and a service migration (for example, onto different NFVI resources). In such a scenario, the EMS or VNFM may instruct the VM/container to stop the VNFCI, which will result in a transition to the Deactivating state 712. There are also exceptional conditions under which a stop event may be issued. In one scenario, two peer VNFCIs have transitioned into the Active state 710. A common cause for this is network isolation of one of the VNFCIs. Once connectivity is restored, one of the instances has to be stopped, so that it can assume the role of backup, ultimately transitioning into a Standby state 716.

If instructed to stop for any reason, the VNFCI transitions into the Deactivating 712 state. In the Deactivating state 712 the VNFCI instructs all software subsystems to perform any actions necessary in order to deactivate. These actions are typically the opposite of those issued in the Activating state 708. These may include, but are not limited to operations such as destroying a queue, closing a communications port and stopping a thread of execution. Once deactivation is complete, the VNFCI transitions into the Shutdown state 702 by halting execution.

While in the Determining State 706 state, if the peer operational state can be determined and is Activating 708 or Active 710, then this VNFCI transitions into the Synchronizing state 714 which indicates to its peer VNFCI that it intends to fulfill the role of a backup. In one embodiment, the VNFC is "stateful" and therefore the VNFCI requests current service state data from its peer VNFCI in the Activating 708 or Active 710 state. While the state data is being received during the synchronization process, checkpoints with new state data may be queued on the VNFCI in the Active 710 state and later sent, in order to preserve the order of operations. Once the synchronization process is complete, the VNFCI transitions into the Standby state 716. While in the Standby state 716, the VNFCI receives and processes new service state checkpoints, so that it is ready to transition into the Activating 708 state if the need arises.

While in the Standby state 716, two types of events will drive the VNFCI operational state machine 700 into the Activating state 708. The first is a peer failure detection event coming from a peer state software subsystem. In one embodiment, this may be a heartbeat failure notification coming from a heartbeat subsystem. In another embodiment, this may be a peer VNFCI failure notification coming from a VNFM management subsystem. In yet another embodiment, this may be a peer VNFCI failure notification coming from an EMS management subsystem.

The second type of event that will drive the VNFCI state machine 700 into the Activating state 708 is a peer stop notification. These are typically driven by a maintenance event on the peer VNFCI while in the Active state 710. An example of such a maintenance event, is a software upgrade, which will result in a stop request being issued to a VNFCI so that a new software load can be executed. In one embodiment, a peer stop notification may be a VNFCI stop notification coming from a heartbeat subsystem. In another embodiment, this may be a VNFCI stop notification coming from a VNFM management subsystem. In yet another embodiment, this may be a VNFCI stop notification coming from an EMS management subsystem. The benefit of the stop notification is the ability to coordinate the switch of activity between the VNFCI in the Active state 710 and the one in the Standby state 716. Without it, failure would have to be detected first, which results in additional service request processing failures.

Barring a failure of or stoppage of a peer VNFCI, a VNFCI in the Standby state 710 will remain in the Standby state 710 until it receives a Stop request typically as a result of a larger maintenance operation such as, but not limited to an upgrade. If a stop request is received, the VNFCI will transition into the Shutdown state 702 by halting execution.

Figure 8:
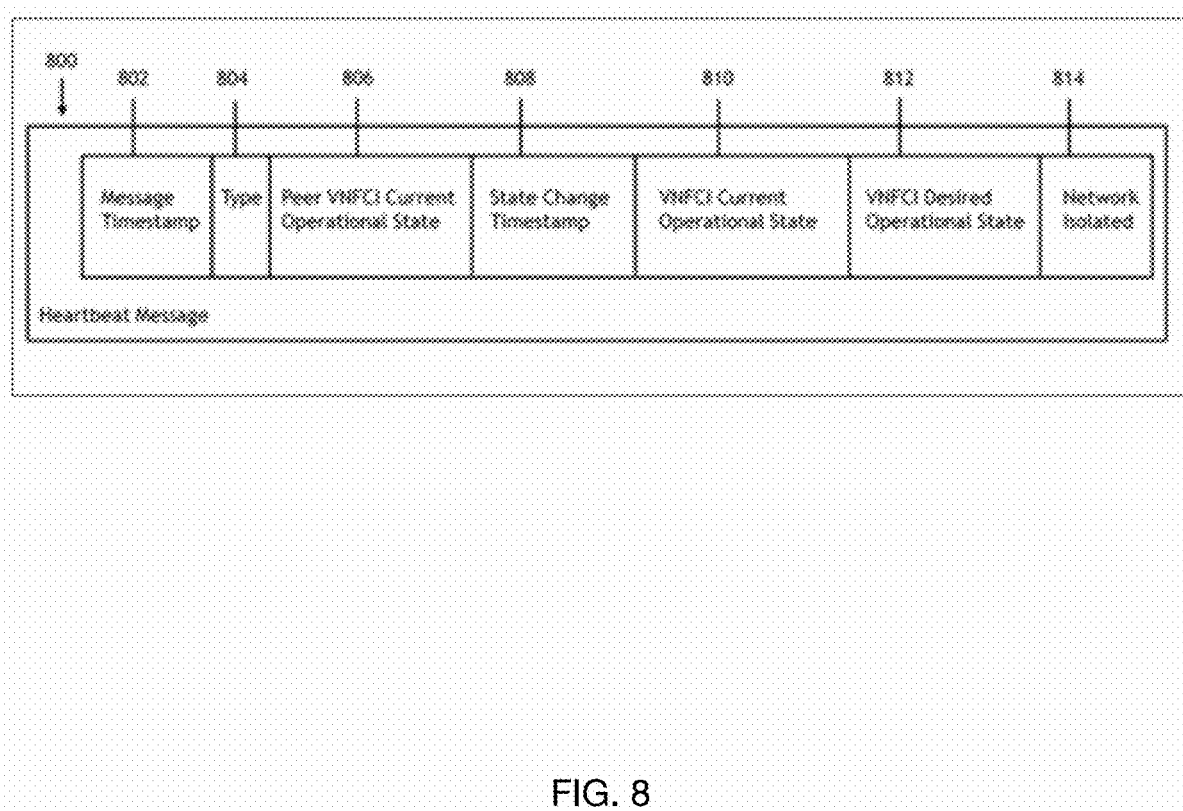
FIG. 8 is a diagram of an embodiment of a heartbeat message structure diagram in accordance with one or more embodiments.

In accordance with one or more embodiments of the present application, FIG. 8 illustrates a structure diagram of a heartbeat message 800 that may be used to enable Active/Standby fault tolerance in a VNFCI. In a preferred embodiment, VNFCIs that employ Active/Standby fault tolerance include a heartbeat software subsystem which send heartbeat notifications to peer VNFCIs and acknowledge ones that are received. In one embodiment, a heartbeat message 800 may contain a message timestamp attribute 802 which records the time at which the VNFCI sent the message 800. A heartbeat message 800 contains a heartbeat message type 804 which indicates whether this message is a notification or an acknowledgement of a notification being received. Additionally, the heartbeat message 800 contains a peer VNFCI current operational state attribute 806 which will contain the heartbeat sender view of its peer's last known operational state. This information may be useful when determining what action to take in exceptional conditions such as, but not limited to, when two peer VNFCIs have transitioned into the Active state. In a preferred embodiment, the VNFCI operational state will be one of the states depicted in FIG. 7 700. If an initial view of the operational state has not been determined, the value will reflect that it is unknown. The heartbeat message 800 may contain a message timestamp attribute 808 which records the time of the last VNFCI operational state change. Additionally, the heartbeat message 800 contains a VNFCI current operational state attribute 810, which will contain the current operational state of the VNFCI. This information is used for normal operation of a VNFCI state machine employing Active/Standby fault tolerance using a heartbeat subsystem. In a preferred embodiment, the VNFCI current operational state will be one of the states depicted in FIG. 7. A heartbeat message 800 may also contain a VNFCI desired operational state attribute 812, which contains the desired final operational state the sending VNFCI. In a preferred embodiment, this would be either the Shutdown 702, Active 710 or Standby 716 states described in FIG. 7. The information may be used to communicate EMS or VNFM management directives from one VNFCI to another, which can be useful when coordinated action is required between VNFCIs. An example of this is coordinated switch of activity which might be employed during a VNFC upgrade or migration procedure. Additionally, the heartbeat message 800 may contain a network isolation attribute 814, which indicates if the VNFCI has been network isolated since it transitioned into the current operational state specified in attribute 810. Regardless of embodiment, it should be understood that heartbeat message 800 attributes 802-814 can be combined, sent and/or received and parsed in any order.

Figure 9:
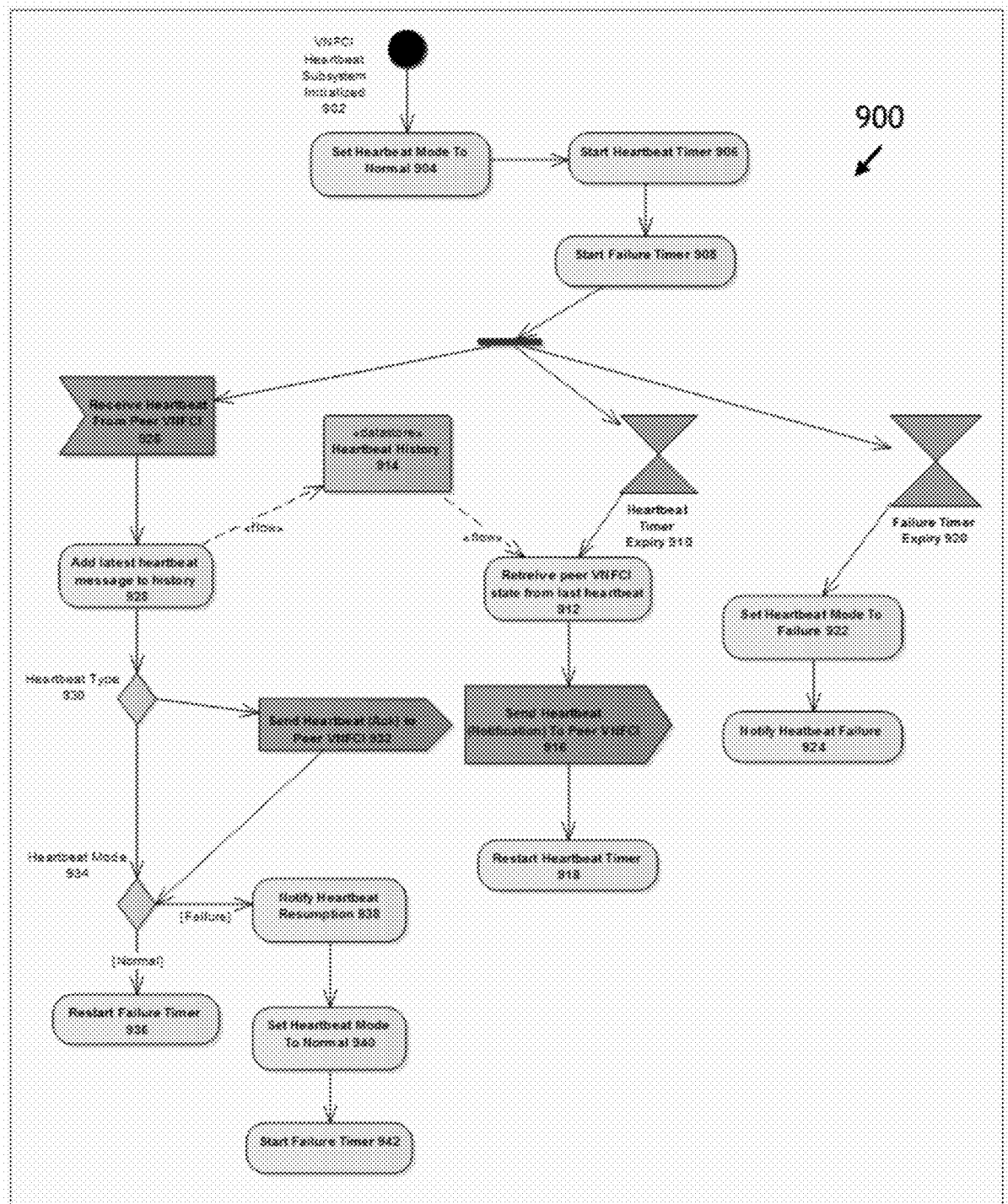
FIG. 9 is a diagram of an embodiment of a heartbeat-based fault detection flow chart in accordance with one or more embodiments.

In accordance with one or more embodiments of the present application, FIG. 9 illustrates a heartbeat-based fault detection process 900 for a VNFCI that employs Active/Standby fault tolerance. In one embodiment, this process is included in a heartbeat software subsystem that is part of a VNFCI software load. A general overview describing the approach is helpful before describing the process in detail. Each VNFCI sends heartbeat notifications to its peer VNFCI at certain intervals. Upon receipt of a heartbeat notification, a VNFCI sends a heartbeat notification acknowledgement in response. In one embodiment, the heartbeat notifications and acknowledgement messages are of the form shown in FIG. 8. If heartbeats are being received in a timely manner, then the heartbeat subsystem is operating in Normal heartbeat mode. However, if a heartbeat notification or acknowledgement is not received from a peer VNFCI in a period of time controlled by a failure timer, then the heartbeat mode is transitioned into Failure mode and a heartbeat failure notification is raised, which will enable the VNFCI operational state machine to take appropriate action. While it is envisioned that the heartbeat intervals for the various modes and timer values will be provisioned by an operator or other individual/entity/process, these values may also be statically defined in the software, or dynamically provisioned based on other provisioning values or operating conditions such as, but not limited to, network latency.

Once the heartbeat subsystem of the VNFCI is initialized 902, the heartbeat mode is set to Normal mode 904. Once the mode is set, a heartbeat timer is started 906. Additionally, a failure timer is started 908 in order to detect loss of heartbeat communication with the peer VNFCI.

When the heartbeat timer expires 910, a heartbeat notification is sent. In one embodiment, that heartbeat notification message is of the form shown in FIG. 8. In order to construct the messages, this VNFCIs view of its peer last known VNFCIs operational state should be determined. This value is determined 912 by retrieving the last received heartbeat message (notification or acknowledgement) from a Heartbeat history datastore 914. In a preferred embodiment, datastore 914 is located in process memory for efficient execution. Once the peer state has been retrieved, the heartbeat notification can be built and sent 916 using the retrieved peer VNFCI operational state and the VNFCI current operational state. Once the heartbeat notification has been sent, the heartbeat timer is restarted 918.

If no heartbeat notification or acknowledgement messages are received by the heartbeat subsystem in the failure time period, the failure timer will expire 920. At this point, the peer VNFCI instance is presumed failed, at least from a heartbeat subsystem perspective. Given this, the heartbeat mode is transitioned to Failure 922. Additionally, a heartbeat notification failure is raised 924. In a preferred embodiment, a failure notification is raised to the VNFCI operational state machine so it can take appropriate action in response to the failure. Appropriate actions are may include, but are not limited to, transitioning this VNFCI into the Active state 710 (See FIG. 7). In one embodiment, a failure notification is sent to a VNFM so it can take appropriate action in response to the failure. In this case, appropriate actions may include, but are not limited to, sending a state change directive a VNFCI and raising an alarm. In another embodiment, a failure notification is sent to an EMS so that it can take appropriate actions as well.

Upon receipt of a heartbeat notification or acknowledgement message from a peer VNFCI 926, the heartbeat message is added 928 to the Heartbeat History datastore 914. The type of heartbeat message is then examined 930. If the heartbeat message type is notification, then an acknowledgement is built using the current operational state of the VNFCI and the current operational state of the peer VNFCI contained in the heartbeat notification, and then sent back to the peer VNFCI 932. For either kind of heartbeat message type, the heartbeat mode is then examined 934. If the mode is set to normal, then the failure timer is restarted 936 to stop it from expiring. This is the normal operating case. If the mode is set to Failure then a failure was previously declared, so a heartbeat resumption notification is raised 938. In a one embodiment, a resumption notification is raised to the VNFCI state machine so it can take appropriate action in response to the resumption of peer communication. Appropriate actions are VNFCI operational state dependent, and may include, but are not limited to, restarting this VNFCI so that it can transition into the Standby state 716 (See FIG. 7) and sending pending checkpoint data to the peer VNFCI. In another embodiment, a resumption notification is sent to a VNFM so it can take appropriate action in response to the latest state information. In this case, appropriate actions may include, but are not limited to, sending a state change directive to a VNFCI and clearing an alarm. In another embodiment, a resumption notification is sent to an EMS so that it can take appropriate action as well. As the flow continues, the heartbeat mode is set back to Normal 940 since heartbeat communication has resumed. Finally, the failure timer is restarted 942, as it previously expired when failure was detected.

Figure 10:
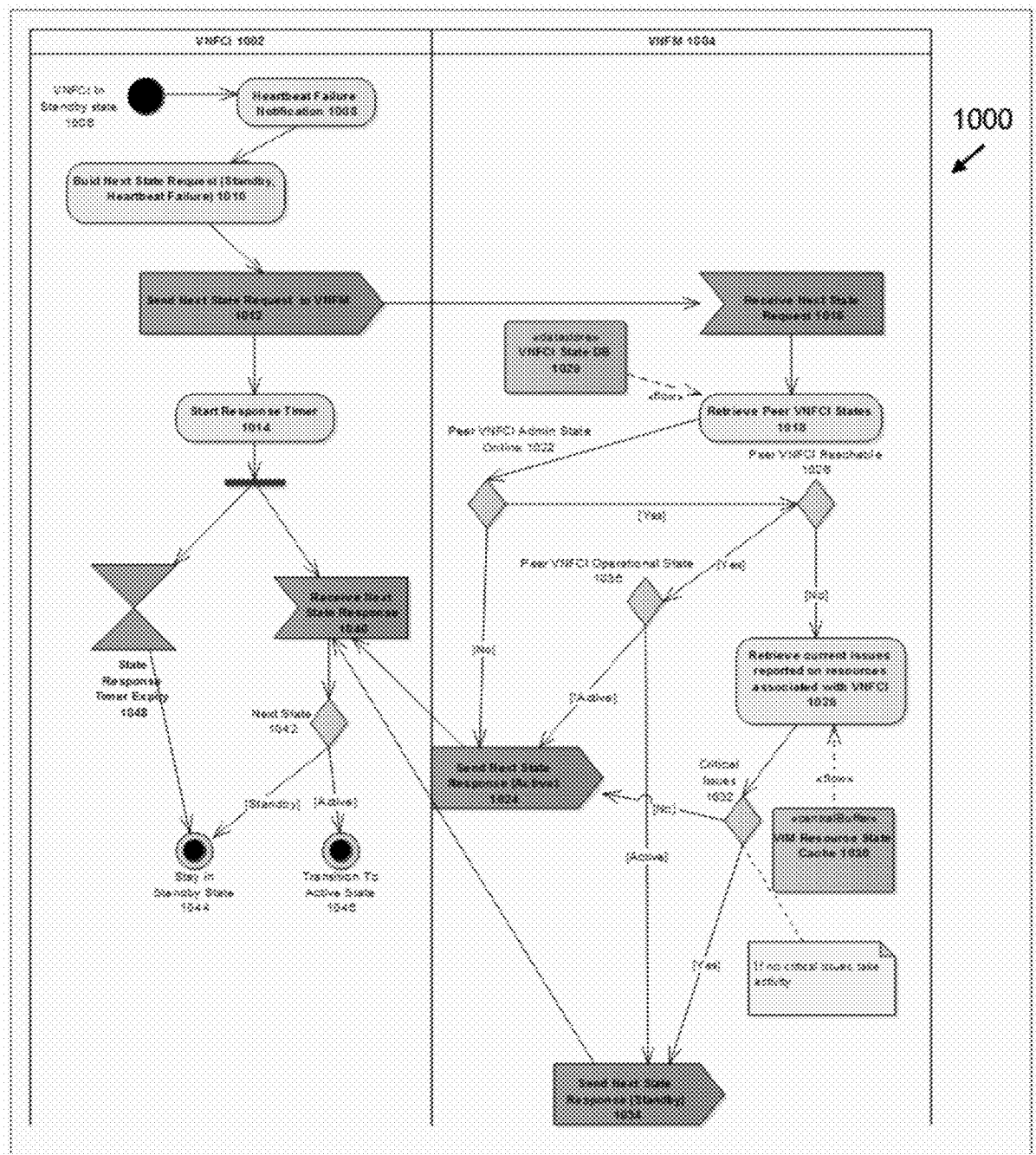
FIG. 10 is a diagram of an embodiment of a VNFM assisted fault handling flow chart in accordance with one or more embodiments.

In accordance with one or more embodiments of the present application, FIG. 10 illustrates a VNFM assisted fault handling process 1000 for a VNFCI that employs Active/Standby fault tolerance. VNFCI 1002 is one of the VNFCIs 310-1 or 310-2 depicted in FIG. 3. Likewise, VNFM 1004 is VNFM 316 depicted in FIG. 3. In one embodiment, the portion of the process contained in VNFCI 1002 is included in the VNFCI operational state machine 700 first introduced in FIG. 7. Specifically, this logic is applied when a VNFCI is in the Standby 716 (see FIG. 7) operational state. In another embodiment, the portion of the process contained in VNFM 1004 is included in VNFM 316 (see FIG. 3). This process has a major advantage over a heartbeat-alone approach because the direction provided by the VNFM 1004, decreases the chances of a split-brain scenario in which multiple VNFCIs transition into an operational state of Active 710 (see FIG. 7).

Initially, a VNFCI 1002 is in the Standby operational state 1006. While in this state, a heartbeat failure notification is received 1008, which indicates that this VNFCI has lost heartbeat communication with its peer VNFCI. In one embodiment, the heartbeat failure notification is generated by a VNFCI heartbeat subsystem as depicted in FIG. 9. Although FIG. 9 depicts a particular heartbeat fault detection process, it should be understood that in other embodiments, that process may differ. For example, in another embodiment failure detection may controlled by a count of missed heartbeats instead of a failure timer expiration 920 (See FIG. 9).

Receipt for the fault detection notification prompts the operational state machine to construct a Next State Request message which includes the VNFCI 1002 identity information, current operational state (Standby) and an error indicator, which is heartbeat failure in this case 1008. This message is sent 1010 to the VNFM 316 (See FIG. 3) that manages this VNFCI 310-1 or 310-2 (See FIG. 3). Once sent, a response timer is started 1012.

Upon receipt of the Next State Request message 1016, the VNFM 1004 determines the peer VNFCI state 1018 based on the initiating VNFCI identity information in the message and then retrieves the administrative, reachability and operational states of the peer VNFCI from a VNFCI state database 1020. In a preferred embodiment, the database 1020 is located in process memory for efficient execution. In a preferred embodiment, the peer VNFCI administrative state will be one of the states depicted in FIG. 6 600. In another preferred embodiment, the peer VNFCI operational state will be one of the states depicted in FIG. 7 700.

The administrative state of the peer VNFCI is then examined 1022. If the peer administrative state is not Online 606 (See FIG. 6), then the VNFCI operational state machine 700 (See FIG. 7) should be transitioned from Standby 716 (See FIG. 7) to Active 710 (See FIG. 7) so that the instance can started providing service. Given this, a Next State Response is built, with an attribute specifying a next state of Active, and sent to the VNFCI 1024. If the peer operational is Online 606 (See FIG. 6) then the network reachable state is examined 1026.

If the peer VNFCI is not network reachable, then the conclusion can be drawn that it is either down or network isolated because neither this VNFCI or the VNFM can communicate with it. Given this, the VNFCI operational state machine 700 (See FIG. 7) should be transitioned from Standby 716 (See FIG. 7) to Active 710 (See FIG. 7), unless there is a critical issue on the virtual or physical resources in the NFVI 106 (See FIG. 1) supporting the VNFC 116 (See FIG. 1) that would prevent it from working properly. In order to check for this condition, current issues on resources associated with the VNFCI 1002 are retrieved 1028 from one or more VIMs 322 (See FIG. 3). In a preferred embodiment, the resource states are stored in a VIM Resource State Cache 1030 located in process memory for efficient execution. In another embodiment, one or more VIMs 322 (See FIG. 3) may be queried 342 (See FIG. 3) for current resource states. The resource states are examined for critical issues 1032. If no critical issues are found, then a Next State Response is built, with an attribute specifying a next state of Active, and sent to the VNFCI 1024. If one or more critical issues are found then a Next State Response is built, with an attribute specifying a next state of Standby, and sent to the VNFCI 1034.

If the peer VNFCI is reachable, then an isolated network issue exists between the VNFCIs 310-1 and 310-2 (See FIG. 3), as the heartbeat subsystem indicated a failure, but the VNFM 316 (See FIG. 3) can communicate with the peer VNFCI 310-1 or 310-2 (See FIG. 3). The peer VNFCI operational state is then examined 1036. If peer VNFCI operational state is not Active 710 (See FIG. 7), then the VNFCI operational state machine 700 (See FIG. 7) should be transitioned from Standby 716 (See FIG. 7) to Active 710 (See FIG. 7). The rationale for this is that this VNFCI has checkpoint state data, so it is best positioned to provide service with minimal disruption. Given this, a Next State Response is built, with an attribute specifying a next state of Active, and sent to the VNFCI 1024. Alternatively, if the peer VNFCI operational state is Active 710 (See FIG. 7), then the VNFCI operational state machine 700 (See FIG. 7) should remain in the Standby 716 state as its peer VNFCI is already providing service. Given this, a Next State Response is built, with an attribute specifying a next state of Standby, and sent to the VNFCI 1034.

If a Next State Response message is delivered to VNFCI 1002, then it is received and parsed 1040. The VNFCI 1002 then examines the next state attribute in the Next State Response message 1042. If the next state is Standby 716 (See FIG. 7), then the operational state machine 700 (See FIG. 7) remains in the Standby state 1044. If the next state is Active 710 (See FIG. 7), then the then the operational state machine 700 (See FIG. 7) transitions into the Active state 1046 (See FIG. 7 for details on the transition from Standby to Active).

If a next state response message is not received from the VNFM 316 (See FIG. 3) in a timely fashion, then the response timer will expire 1048. This indicates that this VNFCI 310-1 or 310-2 (See FIG. 3) is network isolated itself as it can neither communicate to its peer VFNCI 310-1 or 310-2 (See FIG. 3) or its VNFM 316 (See FIG. 3). Its peer VNFCI 310-1 or 310-2 (See FIG. 3) should be in the Active state 716 (See FIG. 7). Given this, the VNFCI operational state machine 700 (See FIG. 7) should remain in the Standby 716 (See FIG. 7) state 1044 as transitioning to an Active 710 (See FIG. 7) state will not be effective and also increase the likelihood of a "split-brain" scenario, multiple VNFCI instances in an Active 710 state (see FIG. 7), that will have to be resolved at a future point in time when communication is restored.

What is claimed is:

1. A system, comprising:
   an operational state machine that sends a next state request message to a Virtual Network Function Manager (VNFM);
   determines an operational state of a peer Virtual Network Function Component Instance (VNFCI) when the peer VNFCI is online;
   sends a first next state response message with a standby state to the VNFCI when the peer VNFCI operational state is active;
   sends a second next state response with an active state to the VNFCI when the peer VNFCI operational state is not active;
   examines, in the VNFCI, a next state attribute in a received next state response message;
   stays in a standby state when the next state attribute is standby; and
   transitions to active state when the next state attribute is active.

2. The system of claim 1, wherein a heartbeat failure is received in the VNFCI when the VNFCI is in standby state, wherein the heartbeat failure notification is received from a VNFCI heartbeat subsystem.

3. The system of claim 1, wherein the next state request message includes a VNFCI identity information, a current operational state, and an error indicator.

4. The system of claim 1, wherein the VNFM retrieves administrative and reachability states of the peer VNFCI from a VNFCI state database upon the reception of the next state request message.

5. The system of claim 1, wherein the VNFM retrieves operational states of the peer VNFCI from a VNFCI state database upon reception of the next state request message.

6. The system of claim 1, wherein current issues reported on resources associated with the VNFCI is retrieved when the VNFCI is not online when the second next state response is sent.

7. The system of claim 6, wherein states of the resources are stored in a VIM Resource State Cache in a process memory.

8. A method, comprising:
sending to a Virtual Network Function Manager (VNFM) a next state request message;
determining if a peer Virtual Network Function Component Instance (VNFCI) is online when an administrative state of the peer VNFCI is online;
sending a first next state response message with a standby state to the VNFCI when the peer VNFCI operational state is active;
sending a second next state response with an active state to the VNFCI when the peer VNFCI operational state is not active;
examining, in the VNFCI, a next state attribute in a received next state response message;
staying in a standby state when the next state attribute is standby; and
transitioning to active state when the next state attribute is active.

9. The method of claim 8, wherein a heartbeat failure is received in the VNFCI when the VNFCI is in standby state, the wherein the heartbeat failure notification is received from a VNFCI heartbeat subsystem.

10. The method of claim 8, wherein the next state request message includes a VNFCI identity information, a current operational state, and an error indicator.

11. The method of claim 8, wherein the VNFM retrieves administrative and reachability states of the peer VNFCI from a VNFCI state database upon the reception of the next state request message.

12. The method of claim 8, wherein the VNFM retrieves operational states of the peer VNFCI from a VNFCI state database upon reception of the next state request message.

13. The method of claim 8, wherein current issues reported on resources associated with the VNFCI is retrieved when the VNFCI is not online when the second next state response is sent.

14. The method of claim 13, wherein states of the resources are stored in a VIM Resource State Cache in a process memory.

15. A non-transitory computer readable medium comprising instructions, that when read by a processor, cause the processor to perform:
sending to a Virtual Network Function Manager (VNFM) a next state request message;
determining if a peer Virtual Network Function Component Instance (VNFCI) is online when an administrative state of the peer VNFCI is online;
sending a first next state response message with a standby state to the VNFCI when the peer VNFCI operational state is active;
sending a second next state response with an active state to the VNFCI when the peer VNFCI operational state is not active;
examining, in the VNFCI, a next state attribute in a received next state response message;
staying in a standby state when the next state attribute is standby; and
transitioning to active state when the next state attribute is active.

16. The non-transitory computer readable medium of claim 15, wherein a heartbeat failure is received in the VNFCI when the VNFCI is in standby state, wherein the heartbeat failure notification is received from a VNFCI heartbeat subsystem.

17. The non-transitory computer readable medium of claim 15, wherein the next state request message includes a VNFCI identity information, a current operational state, and an error indicator.

18. The non-transitory computer readable medium of claim 15, wherein the VNFM retrieves administrative and reachability states of the peer VNFCI from a VNFCI state database upon the reception of the next state request message.

19. The non-transitory computer readable medium of claim 15, wherein the VNFM retrieves operational states of the peer VNFCI from a VNFCI state database upon reception of the next state request message.

20. The non-transitory computer readable medium of claim 15, wherein current issues reported on resources associated with the VNFCI is retrieved when the VNFCI is not online when the second next state response is sent.

* * * * *